(12) United States Patent
Lu et al.

(10) Patent No.: US 10,979,568 B1
(45) Date of Patent: Apr. 13, 2021

(54) GRAPHICAL RENDERING FOR INTERACTIVE VOICE RESPONSE (IVR)

(71) Applicant: INTERNATIONAL BUSINESS MACHINES CORPORATION, Armonk, NY (US)

(72) Inventors: Cindy Han Lu, San Jose, CA (US); Thai Quoc Tran, San Jose, CA (US); Srinivas R. Brahmaroutu, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/816,472

(22) Filed: Mar. 12, 2020

(51) Int. Cl.
| | |
|---|---|
| *H04M 3/51* | (2006.01) |
| *H04M 3/42* | (2006.01) |
| *G06F 3/0484* | (2013.01) |
| *G06F 3/0482* | (2013.01) |
| *G06F 3/0481* | (2013.01) |

(52) U.S. Cl.
CPC ........ *H04M 3/5166* (2013.01); *G06F 3/0482* (2013.01); *G06F 3/0484* (2013.01); *G06F 3/04817* (2013.01); *H04M 3/42059* (2013.01); *H04M 2203/252* (2013.01); *H04M 2203/551* (2013.01)

(58) Field of Classification Search
CPC ............. H04M 3/4938; H04M 3/5166; H04M 3/42059; H04M 7/1205; H04M 2203/551; H04M 2203/252; H04M 2203/254; G06F 3/04817; G06F 3/0482; G06F 3/0484; H04L 65/1089; H04L 65/4007

USPC .......... 379/88.11, 88.13, 88.14, 88.18, 88.19
See application file for complete search history.

(56) References Cited

U.S. PATENT DOCUMENTS

| | | | | |
|---|---|---|---|---|
| 9,374,693 | B1 | 6/2016 | Olincy | |
| 10,496,245 | B2* | 12/2019 | Wang | ................. H04L 65/1033 |
| 2002/0077819 | A1 | 6/2002 | Girardo | |
| 2011/0158222 | A1* | 6/2011 | Kerr | ................... H04L 65/1089 370/352 |
| 2011/0293077 | A1 | 12/2011 | Dubut | |

(Continued)

OTHER PUBLICATIONS

Mell et al., "The NIST Definition of Cloud Computing", National Institute of Standards and Technology, Special Publication 800-145, Sep. 2011, 7 pages.

*Primary Examiner* — Binh Kien Tieu
(74) *Attorney, Agent, or Firm* — Rakesh Roy

(57) ABSTRACT

A method, computer system, and a computer program product for dynamic graphical rendering of call options is provided. The present invention may include receiving, by an interactive voice response (IVR) system, a phone call from a telephonic device. The present invention may include determining that the telephonic device includes a visual menu device type. The present invention may include generating a visual prompt menu having a visual representation of a set of call options included in the IVR system. The present invention may include transmitting the generated visual prompt menu to a display of the telephonic device. The present invention may include receiving, from the telephonic device, at least one selected call option from the generated visual prompt menu. The present invention may include processing, by the IVR system, a call sequence based on the received at least one selected call option from the generated visual prompt menu.

19 Claims, 8 Drawing Sheets

(56) References Cited

U.S. PATENT DOCUMENTS

| | | |
|---|---|---|
| 2015/0004947 A1 | 1/2015 | Li |
| 2017/0013128 A1* | 1/2017 | Sasidharan |
| 2017/0212647 A1* | 7/2017 | Wang ................. H04L 65/1033 |
| 2018/0255178 A1 | 9/2018 | Deng |
| 2019/0342450 A1* | 11/2019 | Kulkarni ................. H04M 3/24 |

* cited by examiner

US 10,979,568 B1

GRAPHICAL RENDERING FOR INTERACTIVE VOICE RESPONSE (IVR)

BACKGROUND

The present invention relates generally to the field of computing, and more particularly to telecommunications.

Many organizations deploy interactive voice response (IVR) solutions when providing customer service via telephone calls. IVR enables organizations to handle large call volumes by directing callers through self-service interactions. During the self-service interactions, callers typically listen to automated voice prompts instructing the callers to select from a list of options to service the callers' request. Although IVR may be efficient for organizations, a caller may find that spending time listening to automated voice prompts, and waiting to hear all the instructions before selecting the options to service the caller's request may be inefficient.

SUMMARY

Embodiments of the present invention disclose a method, computer system, and a computer program product for dynamic graphical rendering of call options. The present invention may include receiving, by an interactive voice response (IVR) system, a phone call from a telephonic device. The present invention may include determining that the telephonic device includes a visual menu device type. The present invention may include generating a visual prompt menu having a visual representation of a set of call options included in the IVR system. The present invention may include transmitting the generated visual prompt menu to a display of the telephonic device. The present invention may include receiving, from the telephonic device, at least one selected call option from the generated visual prompt menu. The present invention may include processing, by the IVR system, a call sequence based on the received at least one selected call option from the generated visual prompt menu.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
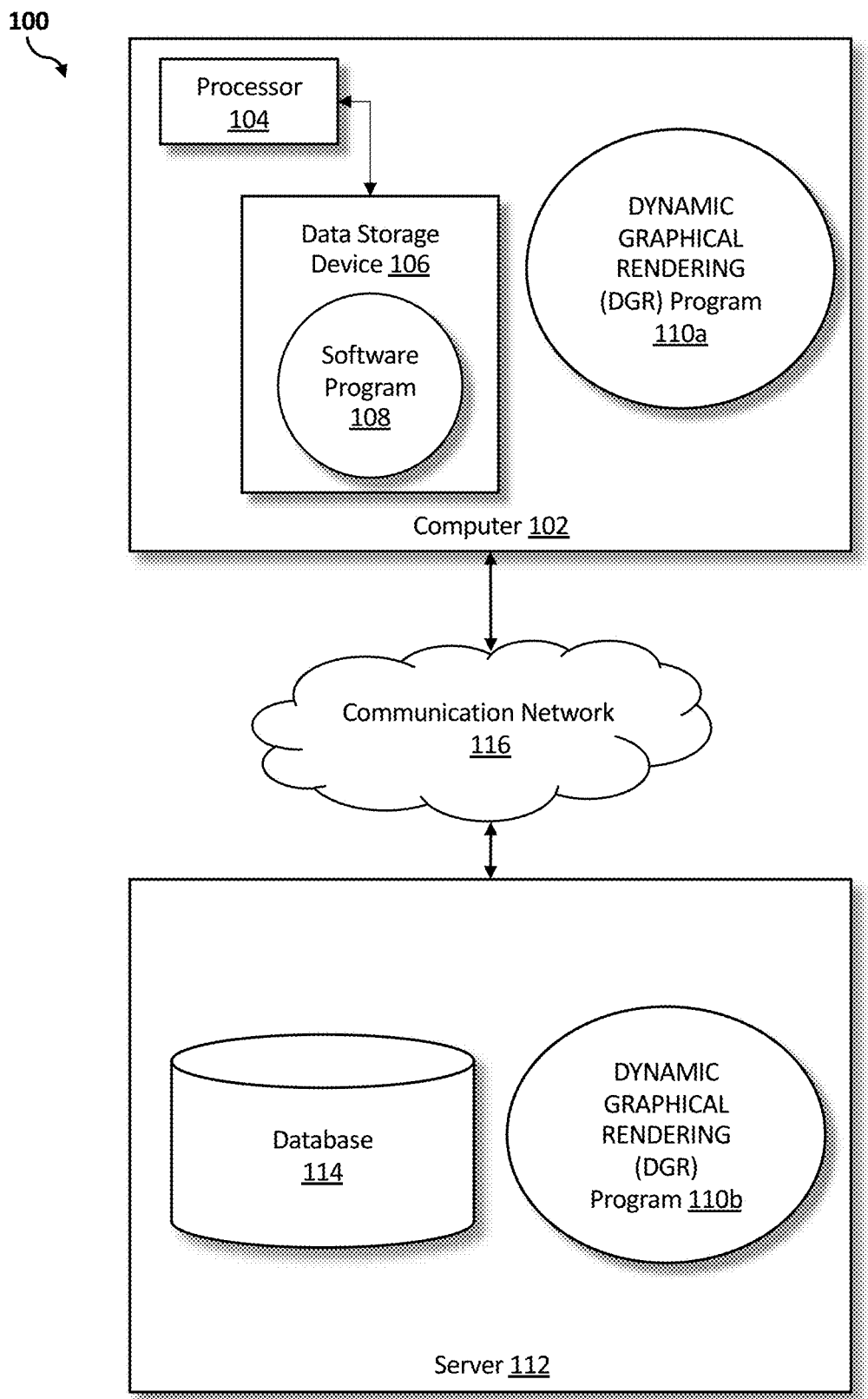
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for dynamic graphical rendering of call options in IVR systems. As such, the present embodiment has the capacity to improve the technical field of telecommunications by graphically rendering the audio prompts of an IVR system into interactive visualizations displayed on a caller's telephonic device. More specifically, an IVR system may receive a call from a telephonic device. Then, the IVR system may determine if the telephonic device is a visual prompt supporting device type (e.g., visual menu device type). If the IVR system determines that the telephonic device is not a visual prompt supporting device type, the IVR system may transmit audio prompts to the telephonic device to initiate an IVR dialogue. If the IVR system determines that the telephonic device is a visual prompt supporting device type, the IVR system may generate a visual prompt menu using IVR metadata, where the IVR metadata may indicate a mapping of telephone keypad inputs to call options and branching sequences. Next, the telephonic device may display the visual prompt menu instead of a keypad so that a caller may directly select the option bested suited to service the caller's request instead of listening to the audio prompts and going through the call options and branches in sequence.

As described previously, many organizations deploy IVR solutions when providing customer service via telephone calls. IVR solutions may include a computerized phone system providing self-service interactions to callers requesting information or services. By directing callers through automated self-service interactions, IVR systems enable organizations to handle large call volumes. Although IVR may be efficient for organizations, the typical IVR process may be time consuming and inefficient for the callers. In the typical IVR process, a caller interacting with an IVR system may have to listen to a series of audio prompts instructing the caller to select from recited options using keypad or voice inputs. A caller may not be able to navigate to a target information or service without traversing through a predefined path IVR prompt menu.

Therefore, it may be advantageous, to among other things, provide a way to consume metadata from an organization's IVR system (e.g., for a call center) and graphically render the audio prompts into an interactive visualization for display on a caller's telephonic device. The ability to consume metadata from the IVR system ahead of time and display a visual menu of the call options on a supporting device type (e.g., smart phone) may save the server hosting the IVR system processing time and may further save the caller time on the phone with the call center. It may also be advantageous to receive multiple selected call options from a caller and automatically optimize the call sequence based on an availability and wait-time associated with each selected option. It may further be advantageous to incorporate prior call history and activity for real-time personalization of the visual menu.

According to at least one embodiment, the visual menu may include various forms, such as, for example, a tree structure, a list structure, or any other suitable graph structure. The visual menu may include a text representation (e.g., text nodes) of the call options. In one embodiment, the text representation may be selected by the caller to reach any depth in the visual menu of call options. In some embodiments, the visual menu may be dynamically customizable and may be configured to process multiple call options selected concurrently. According to one embodiment, the IVR system may enable the caller to select multiple call options and automatically optimize the caller's wait time. For example, the caller may select the corresponding options to reach the billing department, returns department, sales department, and complaints department. Rather than returning the caller to the main menu after each option is completed, the IVR system may prioritize the time for the caller based on the availabilities and/or the dependencies of the call options.

According to at least one embodiment, the IVR system may incorporate prior call history and activity for real-time personalization of the visual menu and/or call. For example, the IVR system may determine, based on the prior call history, that on the first Monday of each month, the caller selects an option to review an account's outstanding balance. Accordingly, when a call is next placed on the first Monday, the IVR system may reduce the caller's time navigating to that option by dynamically highlighting that option in the visual menu (e.g., listing the option first) or directly connecting the caller to the option associated with reviewing the account's outstanding balance. According to another embodiment, the IVR system may detect a dropped call and record the option where the call was dropped. Then, when another call is placed by the same caller, the IVR system may automatically direct the caller to the option where the call was dropped.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a dynamic graphical rendering (DGR) program 110a. The networked computer environment 100 may also include a server 112 that is enabled to run a dynamic graphical rendering (DGR) program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the DGR program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the DGR program 110a, 110b (respectively) to generate a visual representation of a set of call options included in an interactive voice response (IVR) system. The DGR method is explained in more detail below with respect to FIGS. 2 to 5.

Figure 2:
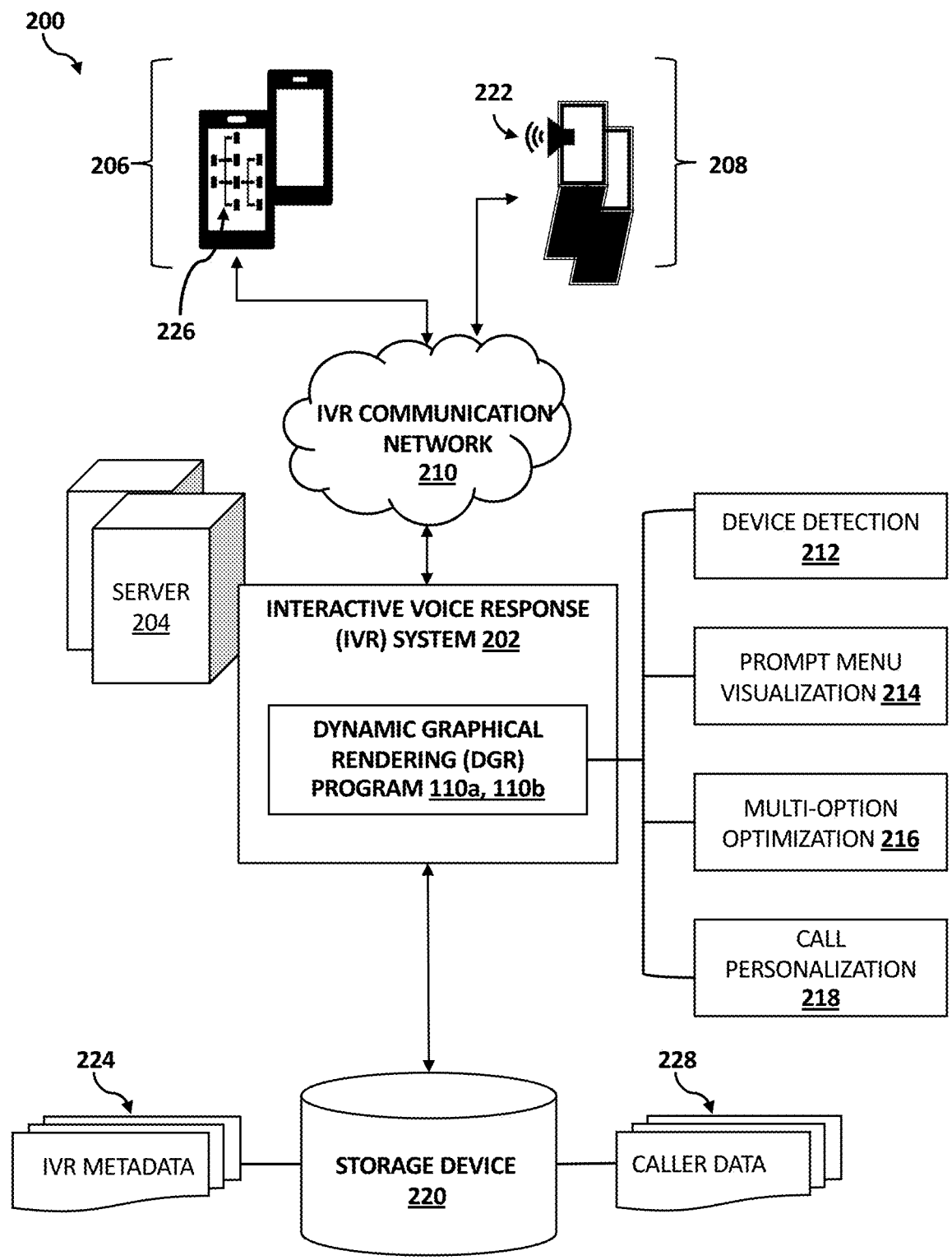
FIG. 2 is a block diagram illustrating an exemplary computerized phone environment according to at least one embodiment.

Referring now to FIG. 2, a block diagram illustrating an exemplary computerized phone environment 200 according to at least one embodiment is depicted. In one embodiment, the computerized phone environment 200 may comprise a networked computer environment, similar to the networked computer environment 100 described with reference to FIG. 1.

According to one embodiment, the computerized phone environment 200 may include an IVR system 202 implemented by one or more servers 204 (e.g., server computer 112). The server 204 may include a processor component and a memory component configured to support communication with one or more first telephonic devices 206 (e.g., client computer 102) and one or more second telephonic devices 208 (e.g., client computer 102) over an IVR communication network 210 (similar to communication network 116).

In one embodiment, server 204 may include a web/application server configured to execute the IVR system 202. In at least one embodiment, the server 204 may also include a voice server configured to provide an interface (e.g., via text-to-speech, voice recognition, dial tone multifrequency (DTMF) recognition) between the telephonic devices 206, 208 and the IVR system 202.

In one embodiment, the first telephonic device 206 may include a mobile device (e.g., smartphone), an Internet protocol (IP) phone, a personal digital assistant, a netbook, a laptop computer, a tablet computer, a desktop computer, or any type of computing device running a mobile operating system (mobile OS) or personal computer OS capable of making telephone calls over the IVR communication network 210. According to embodiments of the present disclosure, the first telephonic device 206 may include the computing resources (e.g., graphical user interface (GUI)) capable of supporting a visual prompt menu, as will be further detailed below.

In one embodiment, the second telephonic device 208 may include a feature phone (e.g., mobile phone), landline phone, or any other telephonic device having an embedded OS. According to embodiments of the present disclosure, the second telephonic device 208 may not include the necessary computing resources capable of supporting the visual prompt menu, as will be further detailed below.

In one embodiment, the IVR communication network 210 may include a telecommunications network, such as, for example, a public switched telephone network (PSTN). In some embodiments, the IVR communication network 210 may include a Transmission Control Protocol and Internet Protocol (TCP/IP) network. In other embodiments, various types of communication networks may be incorporated into the IVR communication network 210, such as, for example, WAN, LAN, wireless network, and/or satellite network.

In one embodiment, the IVR system 202 may be executed on the server 204 to process phone calls received from the first and second telephonic devices 206, 208 and provide self-service interactions configured to guide callers to complete respective caller requests. In some embodiments, the IVR system 202 may provide audio prompts to guide callers along a predefined path through a prompt menu. The voice prompts may instruct the callers to select the option (e.g., using DTMF or voice recognition) in the prompt menu associated with the callers' request (e.g., for service or information). In response to the selected option, the caller may be routed to another branch of the prompt menu or connected to an automated agent or human operator.

According to embodiments of the present disclosure, the IVR system 202 may include a dynamic graphical rendering (DGR) program 110a, 110b configured to generate the voice prompts as a visual prompt menu to provide callers with faster, alternative interactions with the IVR system 202. The DGR program 110a, 110b may include a single computer program or multiple program modules or sets of instructions being executed by one or more processors of the networked computer environment. As shown in FIG. 2, the DGR program 110a, 110b may include a device detection component 212, a prompt menu visualization component 214, a multi-option optimization component 216, and a call personalization component 218. The DGR program 110a, 110b may be practiced in distributed cloud computing environments where tasks may be performed by remote processing devices which may be linked through the IVR communication network 210 described above. In one embodiment, the DGR program 110a, 110b may include program instructions which may be collectively stored on one or more computer-readable storage media, such as, for example, storage device 220. The DGR program 110a, 110b may include routines, objects, components, units, logic, data structures, and actions that may perform particular tasks or implement particular abstract data types.

According to one embodiment, once a call is established between the IVR system 202 and the first and/or second telephonic devices 206, 208, the program code of the device detection component 212 may be executed by one or more processors to determine if the first and/or second telephonic devices 206, 208 are a visual prompt supporting device type (e.g., visual menu device type). In one embodiment, the server 204 may transmit a request to the first and/or second telephonic devices 206, 208 to indicate whether the telephonic devices are the visual prompt supporting device type. In response, the telephonic devices 206, 208 may transmit respective device identifying information to the server 204, which may be processed by the device detection component 212 to determine device properties (e.g., computing resources, GUI, OS).

As previously noted, the first telephonic device 206 may include the necessary device properties to support the visual prompt menu. Accordingly, the device detection component 212 may determine that the first telephonic device 206 comprises the visual prompt supporting device type. On the other hand, the second telephonic device 208 may not include the necessary device properties to support the visual prompt menu, as previously described. Accordingly, the device detection component 212 may determine that the second telephonic device 208 does not comprise the visual prompt supporting device type.

Accordingly, if the device detection component 212 determines that a call is established between the IVR system 202 and the second telephonic device 208 (e.g., not visual prompt supporting device type), the device detection component 212 may trigger the IVR system 202 to transmit (e.g., via IVR communication network 210) one or more audio prompts 222 to the second telephonic device 208 to guide a corresponding caller through an audio or voice prompt menu.

However, if the device detection component 212 determines that a call is established between the IVR system 202 and the first telephonic device 206 (e.g., visual prompt supporting device type), the device detection component 212 may trigger the prompt menu visualization component 214. In one embodiment, the program code of the prompt menu visualization component 214 may be executed by one or more processors to access one or more IVR metadata 224 in the storage device 220. In one embodiment, the IVR metadata 224 may include information referencing a set of call options included in the IVR system 202. More specifically, the IVR metadata 224 may include information linking the options recited in the audio prompt menu to corresponding keypad inputs. In one embodiment, the IVR metadata 224 may also indicate a branching path of the options recited in the audio prompt menu. In at least one embodiment, the IVR metadata 224 may include wait time information associated with each option. For example, the IVR metadata 224 may indicate that the wait time for action A is 2-5 minutes and/or there are 7 people ahead of the caller for action A.

Using the IVR metadata 224, the prompt menu visualization component 214 may be executed to generate a visual prompt menu 226, as depicted in a display of the first telephonic device 206. The visual prompt menu 226 may include a visual representation of the set of call options included in the IVR system 202. In one embodiment, the visual prompt menu 226 may comprise a tree structure (e.g., sorted tree), a list, a graph, or any suitable data visualization. In embodiments where the visual prompt menu 226 includes the tree structure, each node or leaf may represent a prompt menu option (e.g., in text form) and indicate the keypad input configured to reach the associated prompt menu option. In some embodiments, the nodes may also include a wait time indication associated with the option. Further, each branch of the tree structure may represent a branching path of the prompt menu options.

In one embodiment, after the visual prompt menu 226 is generated by the prompt menu visualization component 214, the IVR system 202 may transmit the visual prompt menu 226 to the first telephonic device 206. In response, the first telephonic device 206 may download the visual prompt menu 226 and display the visual prompt menu 226 in place of the conventional virtual keypad displayed on the first telephonic device 206.

According to at least one embodiment, the IVR system 202 may implement the server 204 to transmit the IVR metadata 224 (e.g., information linking the options recited in the audio prompt menu to corresponding keypad inputs and the branching path of the options) to the first telephonic device 206. In such embodiments, the first telephonic device 206 may include program code which may be executed by a processor of the first telephonic device 206 to generate and render the visual prompt menu 226 on the display of the first telephonic device 206.

Once the visual prompt menu 226 is rendered on the display of the first telephonic device 206, the caller may select the node in the visual prompt menu 226 representing the call option requested by the caller. In response, the IVR system 202 may direct the call through the prompt menu to reach the call option requested by the caller.

According to one embodiment, the DGR program 110a, 110b may enable the caller to queue up multiple service and/or information requests during the call. In one embodiment, the multi-option optimization component 216 may include program code which may be executed by one or more processors to receive the call option inputs from the caller and dynamically generate a call sequence based on received call option inputs. In one embodiment, the DGR program 110a, 110b may optimize the call sequence based on a criteria, such as, option availability (e.g., the availabilities of the call options) and/or option dependency (e.g., dependencies of the call options). In one embodiment, the DGR program 110a, 110b may automatically prioritize an available option (e.g., available call option) over an unavailable option (e.g., unavailable call option). In another embodiment, the DGR program 110a, 110b may automatically process an independent option (e.g., independent call option) prior to processing a dependent option (e.g., dependent call option) depending from the independent option. For example, a first option associated making a payment transfer may be dependent on a second option associated with checking an account balance. Accordingly, the DGR program 110a, 110b may automatically process the independent option (e.g., checking the account balance) prior to processing the dependent option (e.g., making the payment transfer).

According to one embodiment, the DGR program 110a, 110b may enable real-time call personalization based on the caller's prior call history and activity information. In one embodiment, the storage device 220 may include one or more caller data 228 indicating the caller's prior call history and activity information. In one embodiment, the call personalization component 218 may include program code which may be executed by one or more processors to access the caller data 228. In one embodiment, the prompt menu visualization component 214 may incorporate the caller data 228 retrieved by the call personalization component 218 and dynamically customize the visual prompt menu 226 based on the caller's prior call history and activity information. In one embodiment, the visual prompt menu 226 may be dynamically customized to highlight or list first, a previously selected call option (e.g., options historically selected by the caller). For example, the caller data 228 may indicate that on the first Monday of each month, a caller B calls and selects an option C associated with reviewing outstanding account balances. Accordingly, the DGR program 110a, 110b may implement the call personalization component 218 to access the caller data 228 and may implement the prompt menu visualization component 214 to dynamically highlight option C, when caller B calls on the first Monday of each month.

According to some embodiments, the call personalization component 218 may also be implemented to resolve dropped-call scenarios. As noted above, the caller data 228 may include caller's prior call history and activity information. In one embodiment, if the IVR system 202 detects a disconnection and a reconnection of a call between the first telephonic device 206 and the server 204, the call personalization component 218 may be executed to direct the caller to the option where the call was disconnected. According to another embodiment, the call personalization component 218 may detect a dropped call and record the option where the call was dropped (e.g., last connected call option in the call sequence). Then, when a subsequent call is placed by the same caller, the call personalization component 218 may automatically direct the caller to the last connected call option where the call was dropped.

Figure 3:
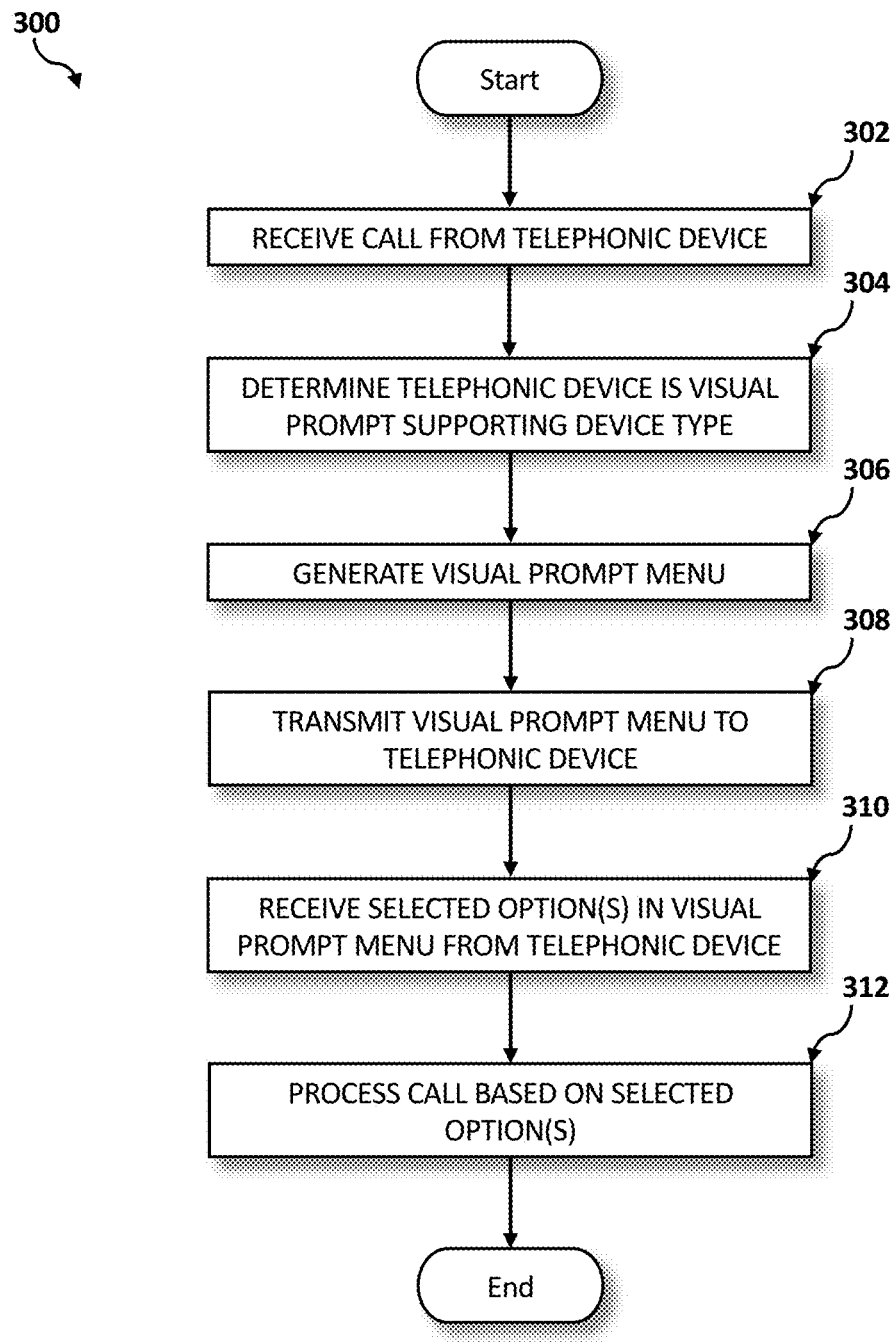
FIG. 3 is an operational flowchart illustrating a process for dynamic graphical rendering (DGR) in an IVR system according to at least one embodiment.

Referring now to FIG. 3, an operational flowchart illustrating the exemplary dynamic graphical rendering (DGR) process 300 used by the DGR program 110a, 110b according to at least one embodiment is depicted.

At 302, a call is received from a telephonic device (e.g., first telephonic device 206 or second telephonic device 208). According to one embodiment, a server hosting an IVR system may receive and establish a phone call with a telephonic device over a communication network (e.g., IVR communication network 210), as described previously with reference to FIG. 2.

Then at 304, the telephonic device is determined to be a visual menu device type e.g., first telephonic device 206). According to one embodiment, the telephonic device may include the computing resources capable of supporting a visual prompt menu. In such embodiments, the DGR program 110a, 110b may determine that the telephonic device is a visual menu device type (e.g., smartphone running a mobile OS), as described previously with reference to FIG. 2. According to one embodiment, the telephonic device may not include the computing resources capable of supporting the visual prompt menu. In such embodiments, the DGR program 110a, 110b may determine that the telephonic device is not a visual menu device type (e.g., feature phone with an embedded OS), as described previously with reference to FIG. 2. The telephonic device may transmit a device identifying information to the server (e.g., server 204) which may be processed to determine device properties (e.g., computing resources, GUI, OS), and whether the device properties may support the visual prompt menu.

Then at 306, the visual prompt menu is generated. According to one embodiment, the visual prompt menu generated by the DGR program 110a, 110b may include a visual representation of a set of call options included in the IVR system. More specifically, the DGR program 110a, 110b may retrieve IVR metadata including information linking the options recited in the audio prompt menu to corresponding keypad inputs, as described previously with reference to FIG. 2. In one embodiment, the IVR metadata may also indicate a branching path of the options recited in the audio prompt menu and the wait time information associated with each option. According to one embodiment, the DGR program 110a, 110b may use the IVR metadata to generate the visual prompt menu, as described previously with reference to FIG. 2.

According to one embodiment, the DGR program 110a, 110b may generate the visual prompt menu as a tree structure including multiple branching paths, as will be described further with reference to FIGS. 4 and 5. In one embodiment, each branching path may include one or more nodes associated with corresponding call options of the set of call options of the IVR system. In one embodiment, the DGR program 110a, 110b may generate a graphical icon to represent the nodes of the tree structure. In one embodiment, the graphical icons may indicate the corresponding call option (e.g., in text form). In one embodiment, the graphical icons may be selectable to execute the corresponding call option.

Then at 308, the visual prompt menu is transmitted to the telephonic device. According to one embodiment, the DGR program 110a, 110b may transmit (e.g., via IVR communication network 210) the generated visual prompt menu to the telephonic device, as described previously with reference to FIG. 2. In another embodiment, the DGR program 110a, 110b may transmit the IVR metadata to the telephonic device such that the telephonic device may generate the visual prompt menu using the received IVR metadata and may display the generated visual prompt menu on a display of the telephonic device, as described with reference to FIG. 2.

Then at 310, one or more selected options in the visual prompt menu are received from the telephonic device. According to one embodiment, the caller may interact with the visual prompt menu to select one or more nodes (e.g., call options) in the visual prompt menu representing the options requested by the caller (e.g., requested service or information). In one embodiment, the IVR system may receive indication of the selected option from the telephonic device, via the IVR communication network 210. In other embodiments, the IVR system may receive indication of multiple call options selected concurrently from the visual prompt menu in the telephonic device, via the IVR communication network 210, as described with reference to FIG. 2.

Thereafter at 312, the call is process based on the one or more selected options. According to one embodiment, the DGR program 110a, 110b may capture the call option inputs from the caller and optimize selected call options based one or more criteria, such as, option availability (e.g., availabilities of the call options) and/or the option dependency (e.g., dependencies of the call options), as described previously with reference to FIG. 2. In one embodiment, a call sequence may be dynamically generated by the DGR program 110a, 110b to process the multiple call options selected concurrently by the caller. The DGR program 110a, 110b may optimize the dynamically generated call sequence based on the one or more criteria noted above.

Figure 4:
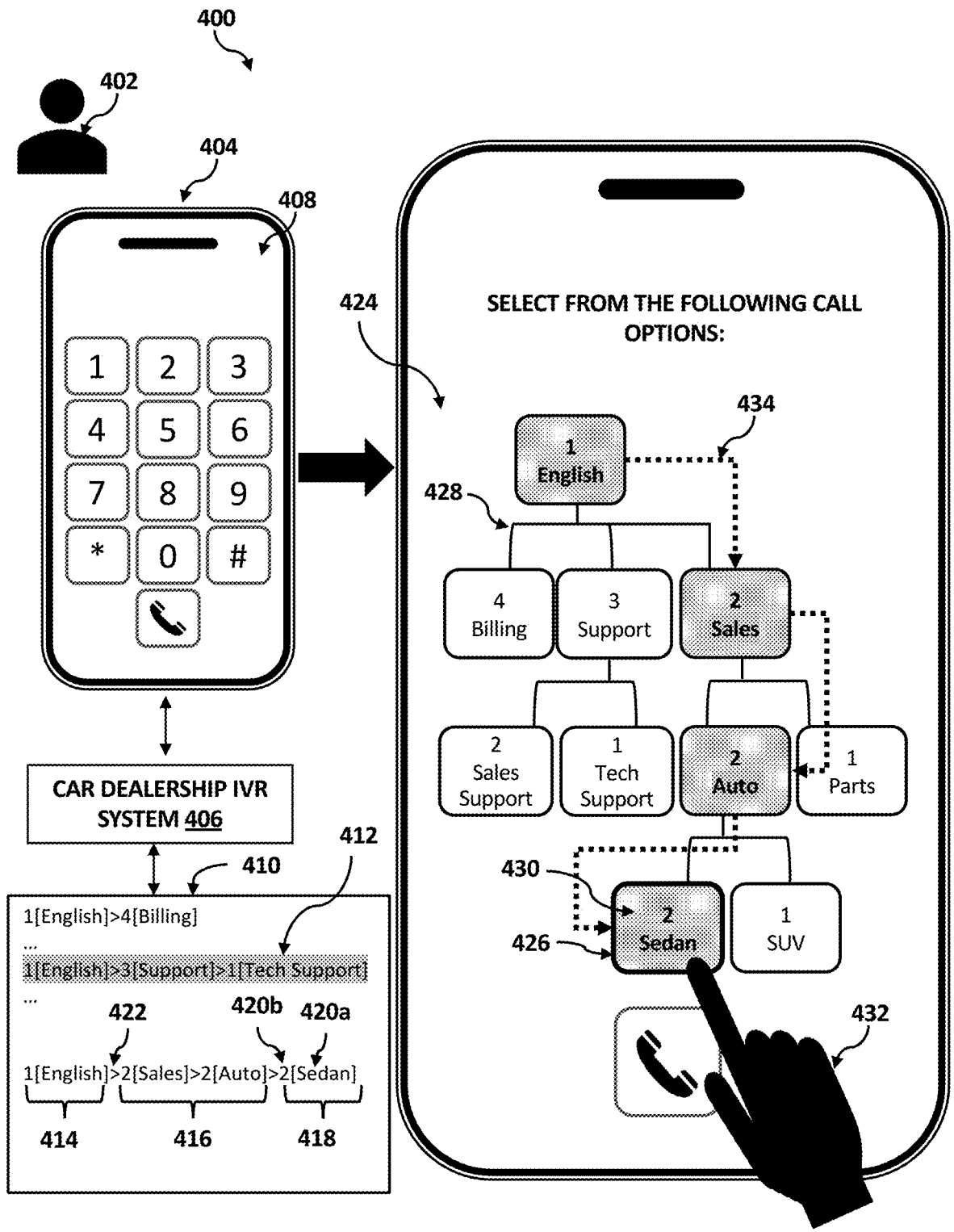
FIG. 4 is a block diagram illustrating an exemplary dynamic rendering of call options according to at least one embodiment.

Referring now to FIG. 4, a diagram 400 illustrating an exemplary dynamic rendering of call options in an IVR system by the DGR program 110a, 110b according to at least one embodiment is depicted.

As shown in FIG. 4, a caller 402 may interact with a telephonic device 404 to establish a telephone call with a car dealership IVR system 406, in a manner similar to the process described with reference to FIGS. 2 and 3.

In one embodiment, the telephonic device 404 may initially display a phone keypad 408 comprising a conventional keypad layout. Once a call is established with the IVR system 406, the telephonic device 404 may communicate with the IVR system 406 to indicate that the telephonic device 404 is configured to support a virtual prompt menu, as described previously with reference to FIGS. 2 and 3.

Next, the DGR program 110a, 110b may consume one or more IVR metadata 410 associated with the car dealership IVR system 406. In embodiments, the IVR metadata 410 may indicate one or more branching paths 412 of the IVR prompt menu. Each branching path 412 may include a starting node 414, one or more leaf nodes 416, and an ending node 418. In some embodiments, the branching path 412 may only include the starting node 414 and the ending node 418. In further embodiments, the branching path 412 may only include the starting node 414. Each of the nodes 414, 416, 418 may indicate an option 420a, representing a service or information provided by the IVR system 406, and a corresponding keypad input 420b mapped to the option 420a in the IVR system 406. For example, in ending node 418 ("2[Sedan]"), the option 420a ("[Sedan]") may represent service or information related to purchasing a sedan and the corresponding keypad input 420b ("2") may indicate the keypad input mapped to the service or information related to purchasing a sedan in the car dealership IVR system 406. In one embodiment, each branching path 412 may also indicate a sequence 422 representing a flow of the branching path 412 between the starting node 414 and the ending node 418.

Then, the DGR program 110a, 110b may use the IVR metadata 410 to generate a visual prompt menu 424, as depicted in an enlarged diagram of the telephonic device 404. In one embodiment, the visual prompt menu 424 may comprise a vertical tree structure, as shown in FIG. 4. For example, each of the nodes 414, 416, 418 may be represented by corresponding graphical icons 426. Further, the sequence 422 representing the flows of the various branching paths 412 may be depicted as lines 428 connecting the corresponding icons 426. Each icon 426 may include text 430 textually indicating the option 420a and the corresponding keypad input 420b.

In the example process illustrated in FIG. 4, the caller 402 would like to speak to a sales representative regarding purchasing a sedan. Once the visual prompt menu 424 is rendered on the display of telephonic device 404, the caller 402 identifies the icon 426 indicating the option 420a ("Sedan") that is most likely to service the request of the caller 402. In response to the caller 402 clicking on the icon 426, the IVR system 406 receives a selection 432. Thereafter, the IVR system 406 may automatically process a call flow 434 ("1[English]>2[Sales]>2[Auto]>2[Sedan]") to direct the caller 402 to the requested option 420a ("Sedan").

Figure 5:
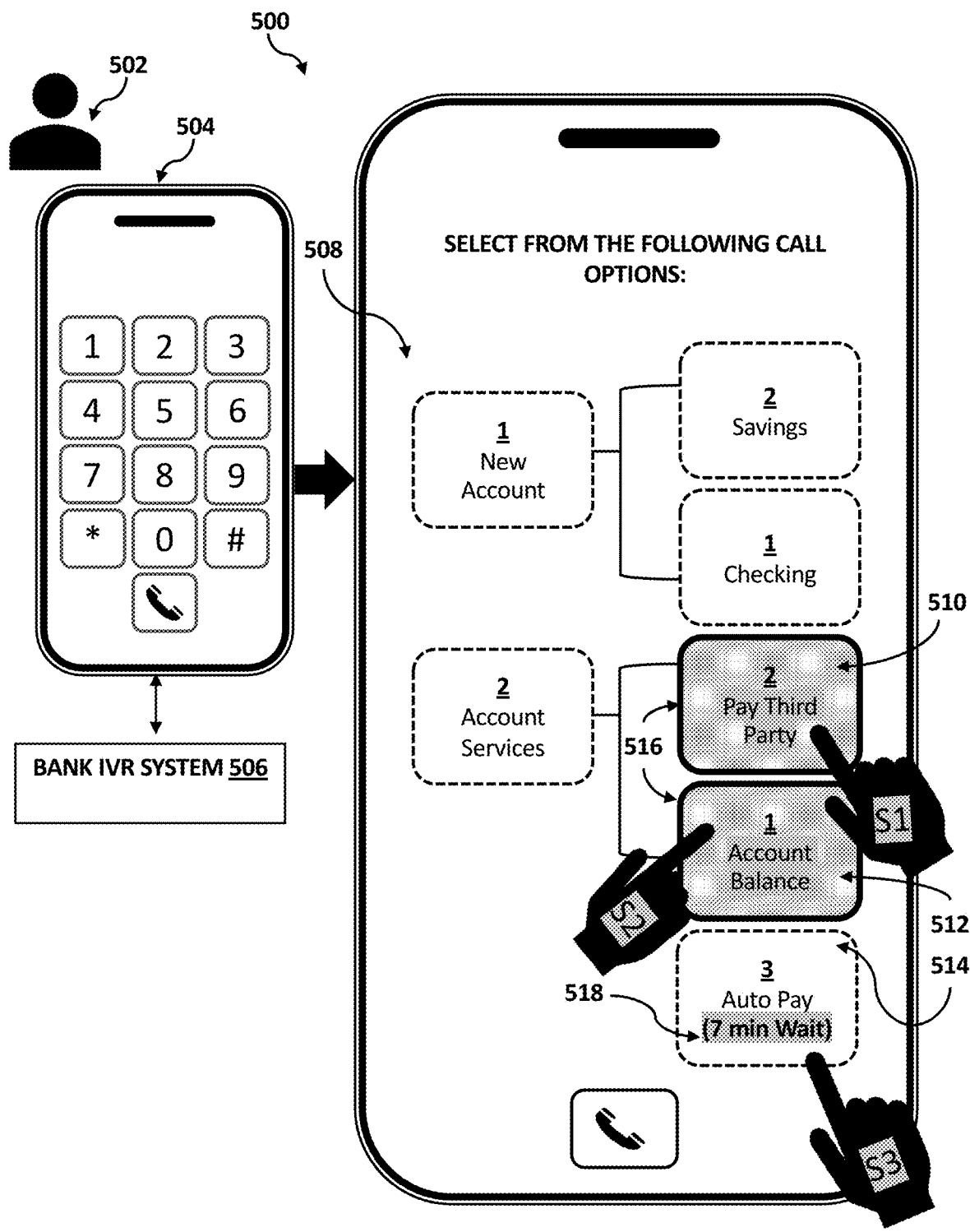
FIG. 5 is a block diagram illustrating another exemplary dynamic rendering of call options according to at least one embodiment.

Referring now to FIG. 5, a diagram 500 illustrating another exemplary dynamic rendering of options for IVR by the DGR program 110a, 110b according to at least one embodiment is depicted.

As shown in FIG. 5, a caller 502 may interact with a telephonic device 504 to establish a telephone call with a bank IVR system 506, in a manner similar to the process described with reference to FIGS. 2 to 4.

Once a call is established with the bank IVR system 506, the telephonic device 504 may communicate with the bank IVR system 506 to indicate that the telephonic device 504 is configured to support a virtual prompt menu, as described previously with reference to FIGS. 2 and 3. Then, the DGR program 110a, 110b may use IVR metadata (e.g., similar IVR metadata 224, 410) to generate a visual prompt menu 508, as depicted in an enlarged diagram of the telephonic device 504. In one embodiment, the visual prompt menu 508 may comprise a horizontal tree structure, as shown in FIG. 4.

In one example, the caller 502 may want to perform three concurrent actions: view an account balance, pay a third party, and set up automatic payments to the third party. Accordingly, the caller 502 may make a first selection S1 of icon 510 (indicating an option to "pay third party"), a second selection S2 of icon 512 (indicating an option to check "account balance"), and a third selection S3 of icon 514 (indicating an option to setup "auto pay").

In one embodiment, the DGR program 110a, 110b may determine, based on the caller data (e.g., 228) associated with caller 502, that caller 502 performs two actions (e.g., viewing account balance, paying third party) every month. Accordingly, the DGR program 110a, 110b may implement a graphical emphasis 516 (e.g., bold icons) on icons 510 and 512 to highlight the caller's most requested selections/options.

In at least one embodiment, the DGR program 110a, 110b may implement a wait time indication 518, as depicted with reference to icon 514. As previously discussed, the wait time may be determined from the IVR metadata (e.g., wait time for action A is 2-5 minutes and/or there are 7 people ahead of the caller for action A). With reference to icon 514, wait time indication 518 represents that there is a 7 minute wait to process the "auto pay" option.

Continuing with the previous example, once a set of actions (e.g., first selection S1, second selection S2, third selection S3) are captured from the visual prompt menu 508, the DGR program 110a, 110b may execute a handshake protocol between the telephonic device 504 and the server (e.g., sever 204) hosting the bank IVR system 506. Thereafter, the DGR program 110a, 110b may generate a call sequence based on the selections captured from the caller 502. In one embodiment, the DGR program 110a, 110b may automatically prioritize which selection/option to execute first, based on availability and/or dependencies. For example, the DGR program 110a, 110b may determine that the "auto pay" option (icon 514) having the 7 minute wait time should be executed last. The DGR program 110a, 110b may also determine that the "pay third party" option (icon 510) may depend on the "account balance" option (icon 512. Accordingly, the DGR program 110a, 110b may first navigate through the process of obtaining the account balance of the caller 502 and then triggering the payment transaction, if the balance is adequate. In one embodiment, the DGR program 110a, 110b may capture all necessary information of caller 502 to process the payment (e.g., name, current location, pay destination) based on the caller data associated with the telephone number of caller 502. Then, the DGR program 110a, 110b may prompt the caller 502 to confirm the bank card number of the caller 502 instead of requiring the caller 502 to manually enter the bank card number. Next, the DGR program 110a, 110b may authenticate the caller 502 and the payment information based on the telephone number associated with the bank account of the caller 502. After processing the "pay the third party" option, the DGR program 110a, 110b may automatically navigate to the "auto pay" option (icon 514) to execute the process of setting up automatic payments for the caller 502.

The functionality of a computer may be improved by the DGR program 110a, 110b because the DGR program 110a, 110b may enable a computer to visually represent a set of options of a prompt menu of an IVR system (e.g., a tree or list structure). In one embodiment, the computer, improved by the DGR program 110a, 110b, may enable a caller to select and chain multiple call options from the visual prompt menu. In one embodiment, the computer, improved by the DGR program 110a, 110b, may capture the called option inputs from the caller and automatically navigate through the prompt menu to process the set of actions associated with the multiple call options. In one embodiment, the computer, improved by the DGR program 110a, 110b, may further personalize the visual prompt menu based on caller data to highlight the call options historically selected by the caller.

In one embodiment, the computer, improved by the DGR program 110a, 110b may optimize the call sequence for multiple selected call options based on criteria, such as, call option availabilities and/or call option dependencies.

It may be appreciated that FIGS. 2 to 5 provide only an illustration of one embodiment and do not imply any limitations with regard to how different embodiments may be implemented. Many modifications to the depicted embodiment(s) may be made based on design and implementation requirements.

Figure 6:
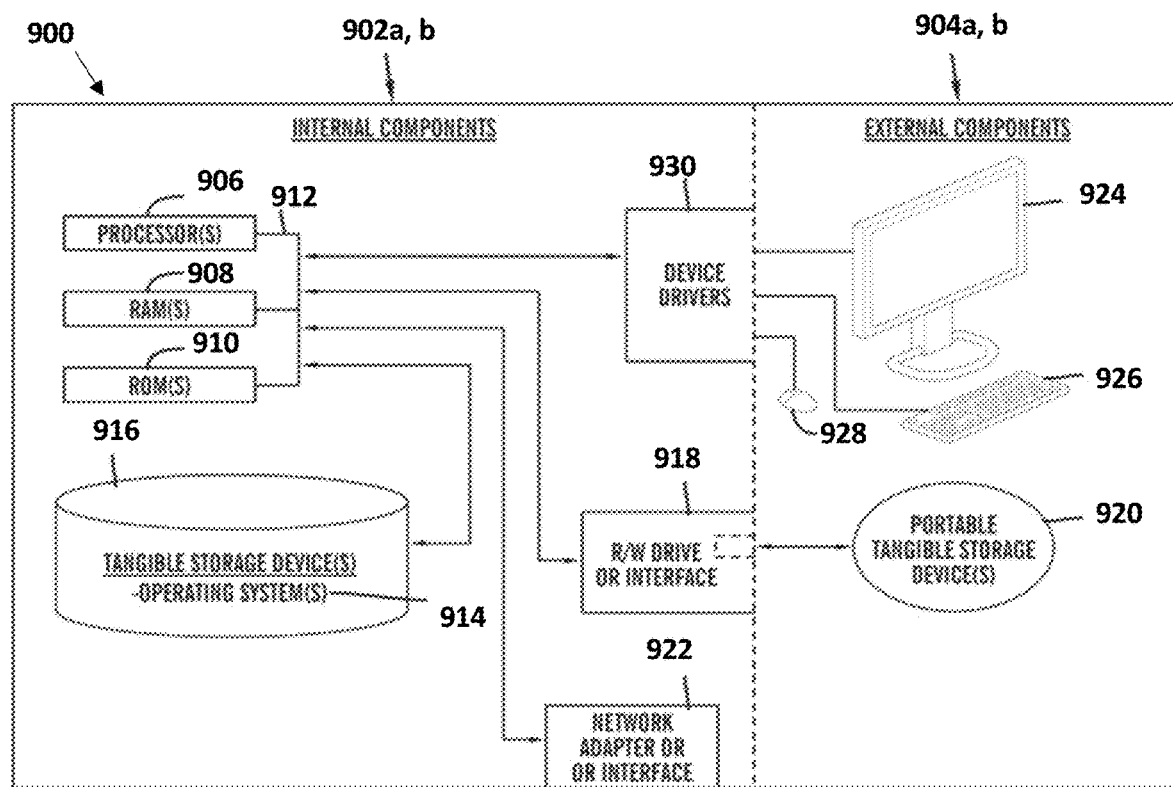
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 6. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the DGR program 110a in client computer 102, and the DGR program 110b in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the DGR program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the DGR program 110*a* in client computer 102 and the DGR program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the DGR program 110*a* in client computer 102 and the DGR program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
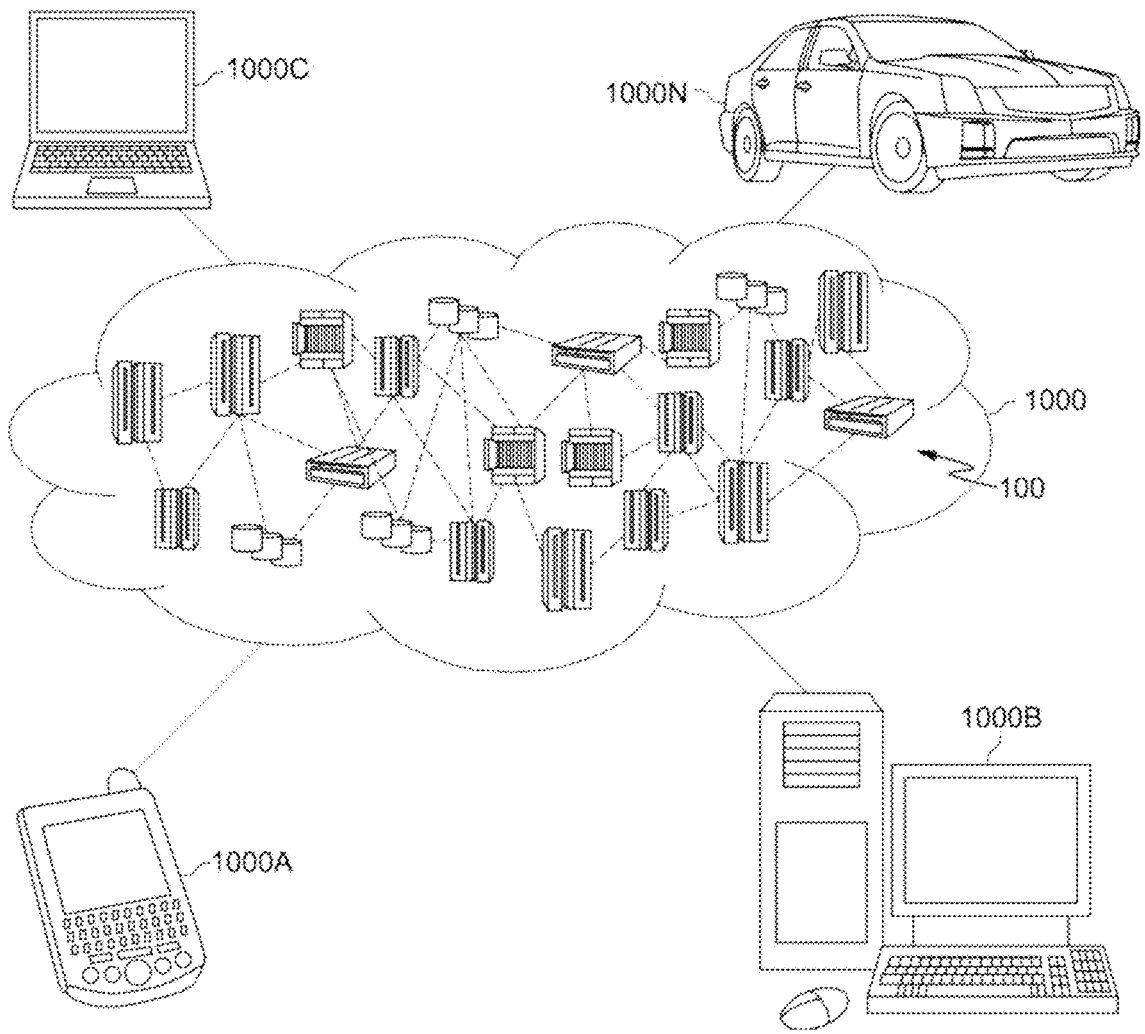
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
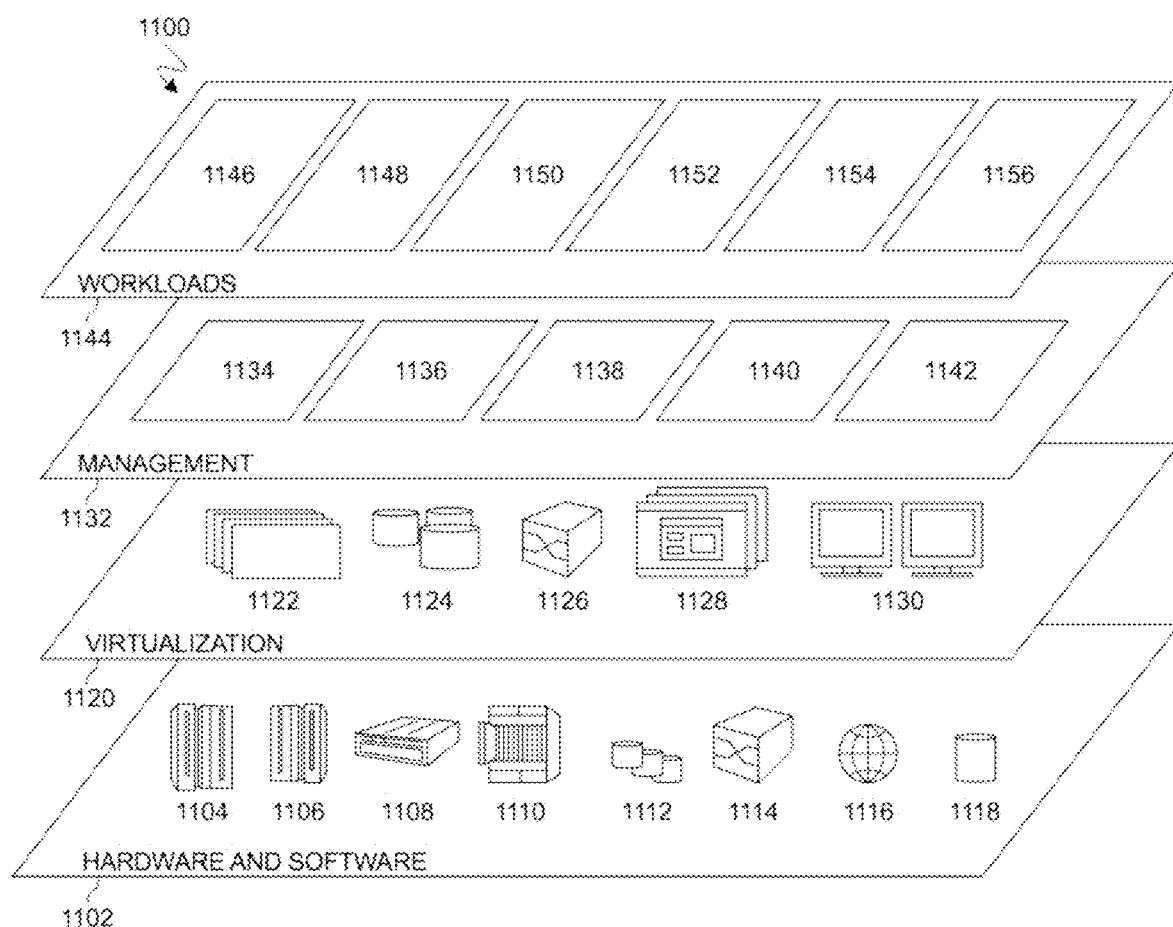
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and dynamic graphical rendering 1156. A DGR program 110a, 110b provides a way to dynamically render a visual menu displaying the call options of an IVR system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving, by an interactive voice response (IVR) system, a phone call from a telephonic device;

determining that the telephonic device includes a visual menu device type;

generating a visual prompt menu, wherein the generated visual prompt menu includes a visual representation of a set of call options included in the IVR system;

transmitting the generated visual prompt menu to a display of the telephonic device;

receiving, from the telephonic device, at least one call option selected from the generated visual prompt menu;

processing, by the IVR system, a call sequence based on the received at least one call option selected from the generated visual prompt menu;

in response to detecting a dropped call, recording a last connected call option in the processed call sequence; and in response to receiving a subsequent phone call from the telephonic device, automatically directing the received subsequent phone call to the recorded last connected call option.

2. The method of claim 1, further comprising:

receiving, by the IVR system, a device identifying information from the telephonic device associated with the received phone call;

determining, based on the received device identifying information, that the telephonic device does not include the visual menu device type; and transmitting, to the telephonic device, an audio prompt menu including the set of call options included in the IVR system.

3. The method of claim 1, further comprising:

accessing a set of IVR metadata associated with the IVR system;

determining, based on the accessed set of IVR metadata, an information linking the set of call options to a corresponding keypad input;

indicating, in the generated visual prompt menu, the corresponding keypad input for the set of call options.

4. The method of claim 1, further comprising:

receiving, from the telephonic device, a plurality of call options selected concurrently from the generated visual prompt menu; and dynamically generating the call sequence for the received plurality of call options.

5. The method of claim 4, further comprising:

optimizing the dynamically generated call sequence for the received plurality of call options based on a criteria selected from the group consisting of an option availability and an option dependency.

6. The method of claim 5, further comprising:

in response to the optimized call sequence, automatically prioritizing an available option over an unavailable option; and in response to the optimized call sequence, automatically processing an independent option prior to processing a dependent option depending from the independent option.

7. The method of claim 1, further comprising:
accessing a stored caller data linked to the telephonic device associated with the received phone call;
determining, based on the accessed caller data, a previously selected call option by the telephonic device; and
dynamically highlighting the determined previously selected call option in the generated visual prompt menu.

8. The method of claim 1, further comprising:
generating the visual prompt menu as a tree structure including a plurality of branching paths, wherein each branching path includes at least one node associated with a corresponding call option of the set of call options.

9. The method of claim 8, further comprising:
generating a graphical icon representing the at least one node of the tree structure, wherein the generated graphical icon textually indicates the corresponding call option; and
in response to receiving a selection of the generated graphical icon, executing the corresponding call option.

10. A computer system for dynamic graphical rendering of call options, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
receiving, by an interactive voice response (IVR) system, a phone call from a telephonic device;
determining that the telephonic device includes a visual menu device type;
generating a visual prompt menu, wherein the generated visual prompt menu includes a visual representation of a set of call options included in the IVR system;
transmitting the generated visual prompt menu to a display of the telephonic device;
receiving, from the telephonic device, at least one call option selected from the generated visual prompt menu;
processing, by the IVR system, a call sequence based on the received at least one call option selected from the generated visual prompt menu;
in response to detecting a dropped call, recording a last connected call option in the processed call sequence; and
in response to receiving a subsequent phone call from the telephonic device, automatically directing the received subsequent phone call to the recorded last connected call option.

11. The system of claim 10, further comprising:
receiving, by the IVR system, a device identifying information from the telephonic device associated with the received phone call;
determining, based on the received device identifying information, that the telephonic device does not include the visual menu device type; and
transmitting, to the telephonic device, an audio prompt menu including the set of call options included in the IVR system.

12. The system of claim 10, further comprising:
accessing a set of IVR metadata associated with the IVR system;
determining, based on the accessed set of IVR metadata, an information linking the set of call options to a corresponding keypad input;
indicating, in the generated visual prompt menu, the corresponding keypad input for the set of call options.

13. The system of claim 10, further comprising:
receiving, from the telephonic device, a plurality of call options selected concurrently from the generated visual prompt menu; and
dynamically generating the call sequence for the received plurality of call options.

14. The system of claim 13, further comprising:
optimizing the dynamically generated call sequence for the received plurality of call options based on a criteria selected from the group consisting of an option availability and an option dependency.

15. The system of claim 14, further comprising:
in response to the optimized call sequence, automatically prioritizing an available option over an unavailable option; and
in response to the optimized call sequence, automatically processing an independent option prior to processing a dependent option depending from the independent option.

16. A computer program product for dynamic graphical rendering of call options, the computer program product comprising:
one or more computer-readable storage media and program instructions collectively stored on the one or more computer-readable storage media, the program instructions comprising:
program instructions to receive, by an interactive voice response (IVR) system, a phone call from a telephonic device;
program instructions to determine that the telephonic device includes a visual menu device type;
program instructions to generate a visual prompt menu, wherein the generated visual prompt menu includes a visual representation of a set of call options included in the IVR system;
program instructions to transmit the generated visual prompt menu to a display of the telephonic device;
program instructions to receive, from the telephonic device, at least one call option selected from the generated visual prompt menu;
program instructions to process, by the IVR system, a call sequence based on the received at least one call option selected from the generated visual prompt menu;
program instructions to, in response to detecting a dropped call, recording a last connected call option in the processed call sequence; and
program instructions to, in response to receiving a subsequent phone call from the telephonic device, automatically directing the received subsequent phone call to the recorded last connected call option.

17. The computer program product of claim 16, further comprising:
program instructions to receive, by the IVR system, a device identifying information from the telephonic device associated with the received phone call;
program instructions to determine, based on the received device identifying information, that the telephonic device does not include the visual menu device type; and program instructions to transmit, to the telephonic device, an audio prompt menu including the set of call options included in the IVR system.

18. The computer program product of claim 16, further comprising:
   program instructions to access a set of IVR metadata associated with the IVR system;
   program instructions to determine, based on the accessed set of IVR metadata, an information linking the set of call options to a corresponding keypad input;
   program instructions to indicate, in the generated visual prompt menu, the corresponding keypad input for the set of call options.

19. The computer program product of claim 16, further comprising:
   program instructions to receive, from the telephonic device, a plurality of call options selected concurrently from the generated visual prompt menu; and
   program instructions to dynamically generate the call sequence for the received plurality of call options.

* * * * *